(12) United States Patent
Fiedler et al.

(10) Patent No.: US 11,222,122 B2
(45) Date of Patent: Jan. 11, 2022

(54) METHOD AND SYSTEM FOR RUNTIME INSTRUMENTATION OF SOFTWARE METHODS

(71) Applicants: Dan Fiedler, Chapel Hill, NC (US); Shane Dabirsiaghi, Baltimore, MD (US)

(72) Inventors: Dan Fiedler, Chapel Hill, NC (US); Shane Dabirsiaghi, Baltimore, MD (US)

(*) Notice: Subject to any disclaimer, the term of this patent is extended or adjusted under 35 U.S.C. 154(b) by 352 days.

(21) Appl. No.: 15/818,460

(22) Filed: Nov. 20, 2017

(65) Prior Publication Data

US 2018/0089440 A1 Mar. 29, 2018

Related U.S. Application Data

(63) Continuation-in-part of application No. 15/294,728, filed on Oct. 15, 2016, which is a continuation-in-part of application No. 15/000,030, filed on Jan. 18, 2016, now abandoned, which is a continuation-in-part of application No. 14/177,628, filed on Feb. 11, 2014, now Pat. No. 9,268,945, which is a continuation-in-part of application No. 13/466,527, filed on May 8, 2012, now Pat. No. 8,844,043, which (Continued)

(51) Int. Cl.
*G06F 21/57* (2013.01)
*G06F 21/51* (2013.01)
*H04L 29/06* (2006.01)
*H04L 12/24* (2006.01)
*G06F 8/30* (2018.01)
*G06F 9/455* (2018.01)
*G06F 8/41* (2018.01)

(52) U.S. Cl.
CPC ............ *G06F 21/577* (2013.01); *G06F 8/316* (2013.01); *G06F 8/47* (2013.01); *G06F 9/4552* (2013.01); *G06F 21/51* (2013.01); *H04L 41/0853* (2013.01); *H04L 41/0893* (2013.01); *H04L 63/1416* (2013.01)

(58) Field of Classification Search
CPC .......... G06F 21/577; G06F 8/316; G06F 8/47; G06F 9/4552
USPC ........................................................... 726/1
See application file for complete search history.

(56) References Cited

U.S. PATENT DOCUMENTS

9,116,717 B2 * 8/2015 Soeder ...................... G06F 8/41
9,332,090 B1 * 5/2016 Fallows .................. H04L 69/04
(Continued)

*Primary Examiner* — Bradley W Holder (57) ABSTRACT

A computerized system of a computing system implementing a .NET framework and useful for instrumenting virtual-machine-based applications includes a computer store containing data, wherein the data comprises: a native library; a computer processor in the computerized system, which computer processor: provides a virtual machine with a Just-In-Time Compilation function; loads the native library into a process memory; redirects the Just-In-Time Compilation function to a custom implementation, wherein the custom compilation function: creates a representation of one or more methods being compiled; and compares the one or more methods against a policy of methods to be instrumented; and determines that one or more methods match the policy of methods to be instrumented.

8 Claims, 11 Drawing Sheets

Related U.S. Application Data is a continuation of application No. 12/870,367, filed on Aug. 27, 2010, now Pat. No. 8,458,798.

(60) Provisional application No. 62/408,775, filed on Oct. 15, 2016, provisional application No. 62/241,897, filed on Oct. 15, 2015, provisional application No. 61/315,666, filed on Mar. 19, 2010.

(56) References Cited

U.S. PATENT DOCUMENTS

| | | | |
|---|---|---|---|
| 2005/0226406 A1* | 10/2005 | Forin | G06F 9/44521 380/1 |
| 2013/0091496 A1* | 4/2013 | Barsness | G06F 9/45516 717/148 |

* cited by examiner

METHOD AND SYSTEM FOR RUNTIME INSTRUMENTATION OF SOFTWARE METHODS

CROSS-REFERENCE TO RELATED APPLICATIONS

This application claims priority to and is a continuation-in-part of U.S. patent application Ser. No. 15/294,728 and filed on Oct. 15, 2016. U.S. patent application Ser. No. 15/294,728 claims priority to U.S. Provisional Application No. 62408775, filed on Oct. 15, 2016 and U.S. Provisional Application No. 62241897, filed on Oct. 15, 2015. U.S. patent application Ser. No. 15/294,728 is a continuation-in-part of U.S. application Ser. No. 15000030, filed on Jan. 18, 2016, which claims benefit to as a continuation-in-part of U.S. application Ser. No. 14/177,628 filed on Feb. 11, 2014 now U.S. Pat. No. 9,268,945, issued Feb. 23, 2016, which claims benefit to U.S. application Ser. No. 13/466,527, filed May 8, 2012, now U.S. Pat. No. 8,844,043, issued Sep. 23, 2014, which claims benefit to U.S. application Ser. No. 12/870,367, filed Aug. 27, 2010, now U.S. Pat. No. 8,458,798, issued Jun. 4, 2013, which claims the benefit to U.S. Provisional Application Ser. No. 61/315,666, filed on Mar. 19, 2010. All of these prior applications are incorporated by reference in their entirety.

BACKGROUND

1. Field

This description relates to modifying software to improve the operation of a computing system, specifically the runtime instrumentation of software methods by replacing an application virtual machine's compile method to achieve redirection of method execution to new managed methods.

2. Related Art

For years, organizations have struggled to block attacks on vulnerable software applications. Application software controls finances, healthcare information, legal records, and even military defenses. Further, application software is growing and interconnecting at an unprecedented rate. This increasing reliance on software combined with common vulnerabilities and rapidly increasing complexity creates significant business risk stemming from the use of software applications. Accurately detecting and defending against attacks on these applications can minimize the likelihood of a breach even when the underlying software contains vulnerabilities.

Protecting the application software can involve a variety of different security defenses, such as input validation, authentication, authorization, encryption, escaping, parameterization, tokenization, and many others. For example, the application software may not properly protect against SQL Injection attacks with escaping or parameterization. Alternatively, the application software may be missing access control checks designed to ensure that users only access authorized data and functions. In another example, the application software can include a logging capability to ensure that records of security-relevant events are captured for later analysis. The logging capability may be missing, weak, disabled, misconfigured, or not used properly. In this case, the application would not be able to capture the security-relevant events necessary to identify attacks, perform intrusion analysis, or any other activity requiring complete logs. Other defenses may be missing, weak, disabled, misconfigured, or not used properly and would be apparent to one of ordinary skill in the art. Therefore, there exists a need for a better method of performing attack detection and protection in software applications and services.

There are several drawbacks and limitations to traditional methods of instrumenting .NET Framework applications. The de facto standard method of instrumentation uses the CLR's Profiling API. The Profiling API has a nontrivial performance impact, is not intended for production environments, and is unable to intercept certain managed methods that are implemented as internal or native functions. The CLR also has a one-profiler limitation so that only one profiler can be attached. Profiling tools commonly specialize on one concern such as performance or security, so under the one-profiler limitation it is impossible to use both a performance profiling tool and a security profiling tool on a .NET Framework application.

Instrumentation can also be achieved by modifying assemblies on disk. This approach conflicts with the .NET Framwork's security model and integrity checking of assemblies to be loaded by the CLR. Furthermore, upgrades or patches applied to the .NET Framework or application will break instrumentation.

Managed methods can be instrumented by intercepting method calls, modifying metadata tables, and modifying the IL of managed methods in memory. Unfortunately, intercepting the same methods as another instrumentation approach (such as the Profiling API) can generate invalid IL and lead to errors in the application.

Many programming languages include support for Aspect-Oriented Programming (AOP) where additional logic is added to the application via instrumentation. AOP-like behavior can currently be achieved for .NET Framework applications in two ways: (1) via use of Invention of Control (IOC) containers or (2) use of static weaving tools IOC containers offer proxy classes that provides dynamic interception mechanisms to replace specific behaviors of the application. This approach can change behavior at runtime but it may require previous access to the source code and is limited in the methods they an intercept, typically only public members on interfaces the developer controls can be intercepted. Static weaving tools can be added to an application's build process to achieve instrumentation-like behavior but still do not achieve run-time instrumentation. Static weaving tools are limited in that they can only modify assemblies built from source code and cannot modify assemblies of the .NET Framework or third party libraries. Furthermore, static weaving tools may require many changes to the source code to be instrumented to add the metadata (i.e. attributes on classes or methods) the tools need.

Therefore, there is a need for a new approach to instrumenting .NET applications that can be performed at runtime without access to source code and that can work alongside other existing instrumentation tools such as profilers.

BRIEF SUMMARY OF THE INVENTION

In one aspect, a computerized system of a computing system implementing a .NET framework and useful for instrumenting virtual-machine-based applications includes a computer store containing data. The data includes a native library. There is a computer processor in the computerized system that implements the following steps. The computer processor provides a virtual machine with a Just-In-Time Compilation function. The computer processor loads the native library into a process memory. The computer processor redirects the Just-In-Time Compilation function to a custom implementation. The custom compilation one or more methods against a policy of methods to be instrumented. The computer processor determines that one or more methods match the policy of methods to be instrumented and compiles the one or more method that matched the policy of methods to be instrumented. The computer processor compiles a redirection target of the one or more methods that matched the policy of methods to be instrumented and leverages a computing system capabilities to load one or more managed libraries. The one or more managed libraries comprises a redirection target and gather information that is not readily available to a native library of the computing system. At least one method in a first managed library of the one or more managed libraries is redirected to a second method in a different managed library of the one or more managed libraries.

BRIEF DESCRIPTION OF THE DRAWINGS

The present application can be best understood by reference to the following description taken in conjunction with the accompanying figures, in which like parts may be referred to by like numerals.

The Figures described above are a representative set, and are not an exhaustive with respect to embodying the invention.

DETAILED DESCRIPTION

Disclosed are a system, method, and article of manufacture for runtime instrumentation of software methods. The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Example Definitions

Attack can be any attempt to destroy, expose, alter, disable, steal, extract data from, corrupt, interfere with, gain unauthorized access to, or make unauthorized use of an asset (e.g. a computer application, etc.).

Application includes all forms of software code executing on computer hardware, including any virtualization hardware technology. An application could be a web application or web service running on a web or application server, a mobile application running on a device, a client or server application running on a desktop computer, or any other form of software.

Caninline is an internal flag used in the CLR to determine if a method should be compiled separately into a native function or the logic should be included as instruction in the currently compiling native function.

Component Object Model (COM) is a technology created by MICROSOFT® and implemented in the WINDOWS® Operating System. It provides a binary interface for applications to communicate. In the .NET Framework, COM is used to expose runtime components and obtain references to internal CLR interfaces.

Common Language Runtime (CLR) can be the virtual machine component of MICROSOFT's .NET framework, manages the execution of .NET programs.

Configuration information can include property files, xml documents, and initialization files and the like.

ICLRMetaHost is an interface exposed by the .NET Framework. It allows native applications to host an instance of the CLR or interact with an instance of the CLR in the same process.

IMetaDataDispenser is an interface exposed by the .NET Framework. It gives programmatic access to interfaces that can obtain metadata from .NET modules. This data can be used to obtain types and method signatures from a module as well as the .NET instructions from methods.

Just-In-Time Compilation (JIT) is the process of interpreting framework, such as .NET, instructions from a module into machine code. In .NET, the CLR performs this compilation when a method is first executed in an application.

Library can be a collection of subprograms, modules, or components.

Redirection target is the memory address of a sensor method. When a method is redirected, its execution is change to the address of the redirection target so sensor code can be executed along with the execution of the original method.

Sensor is a piece of executable code that extracts data from within are executing application. A sensor can also be used to alter the execution of the application. A sensor can be wrapped in exception handling logic that ensures that the application's execution is not unintentionally modified. A sensor can be a passive sensor, an active sensor, and a response sensor.

SQL injection is a code injection technique used to attack data-driven applications, in which nefarious SQL statements are inserted into an entry field for execution.

Native library is a module that has been compiled to run on a specific architecture. Native libraries contain machine code and are not platform independent. As opposed to .NET modules, which can run on any platform that implements the CLR.

Virtual machine is an emulator that allows execution of programs independent of the host platform. This allows the applications compiled for the .NET Framework to run on any system that implements the CLR.

.NET Framework (pronounced dot net) is a software framework developed by MICROSOFT® that runs primarily on MICROSOFT WINDOWS®. It includes a large class library named Framework Class Library (FCL) and provides language interoperability (each language can use code written in other languages) across several programming languages. Programs written for the .NET Framework execute in a software environment (in contrast to a hardware environment) named the Common Language Runtime (CLR), an application virtual machine that provides services such as security, memory management, and exception handling. As such, computer code written using the .NET Framework is called "managed code". The FCL and CLR together constitute .NET Framework.

Example Systems and Processes

The present disclosure describes computer-implemented methods for instrumenting applications running on application virtual machines with a Just-In-Time Compilation method(s) such as applications targeting the .NET Framework, and running on the CLR. The systems and methods can be used for general and specific uses of instrumentation. Instrumentation can be used for a wide array of purposes such as gathering performance information, modifying application functionality, fixing defects, aiding in debugging, improving security, identifying vulnerabilities, identifying attacks, and blocking attacks.

The present disclosure avoids the drawbacks of traditional instrumentation approaches by working on the native prologue portions of methods to be instrumented. The present disclosure operates entirely at runtime, executing in the memory of the process hosting the CLR, and without modifying assemblies on disk.

Figure 1:
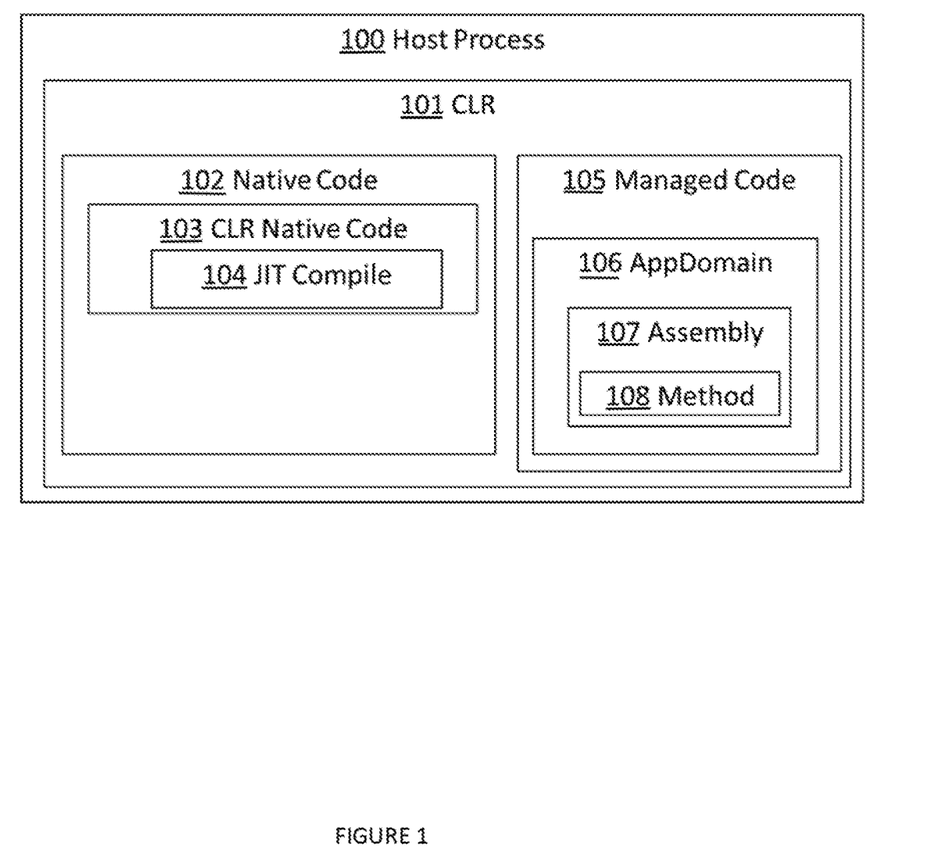
FIG. 1 illustrates the hosting of the CLR within a host process without instrumentation, according to some embodiments.

FIG. 1 illustrates a Host Process 100 hosting an instance of the .NET Framework's CLR 101 without an instrumentation engine, according to some embodiments. Code running on the CLR 101 can be divided into two logical groupings: Native Code 102 and Manage Code 105. Native Code 102 includes the CLR Native Code 103 of various unmanaged functions that provide the CLR's functionality including 104 JIT Compile function. The Manage Code 105 holds one or more Application Domains (e.g. AppDomain 106), each of which holds one or more Assemblies 107, each of which holds one or more Methods 108.

Figure 2:
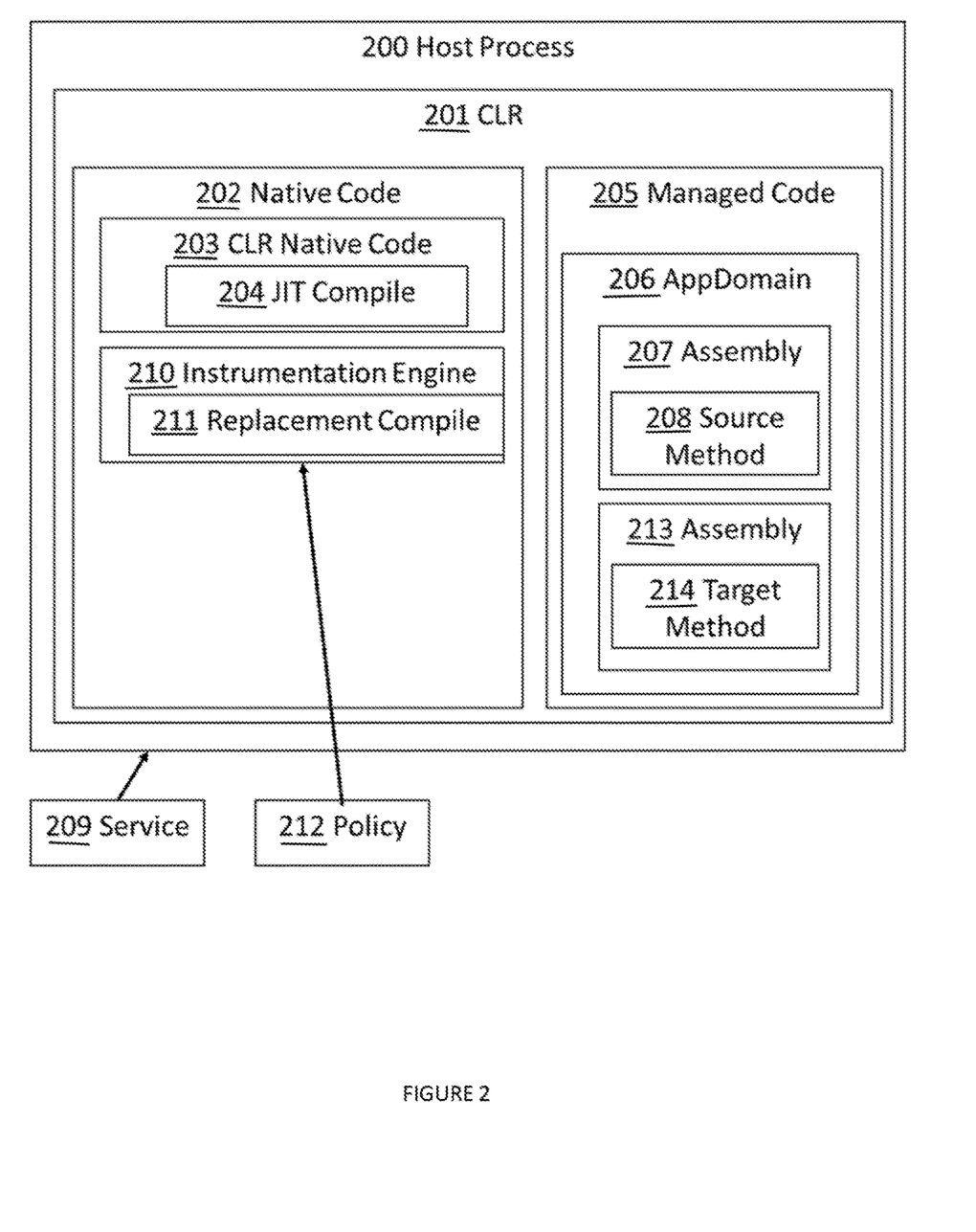
FIG. 2 illustrates the hosting of the CLR within a host process with the instrumentation engine loaded, according to some embodiments.
Figure 3:
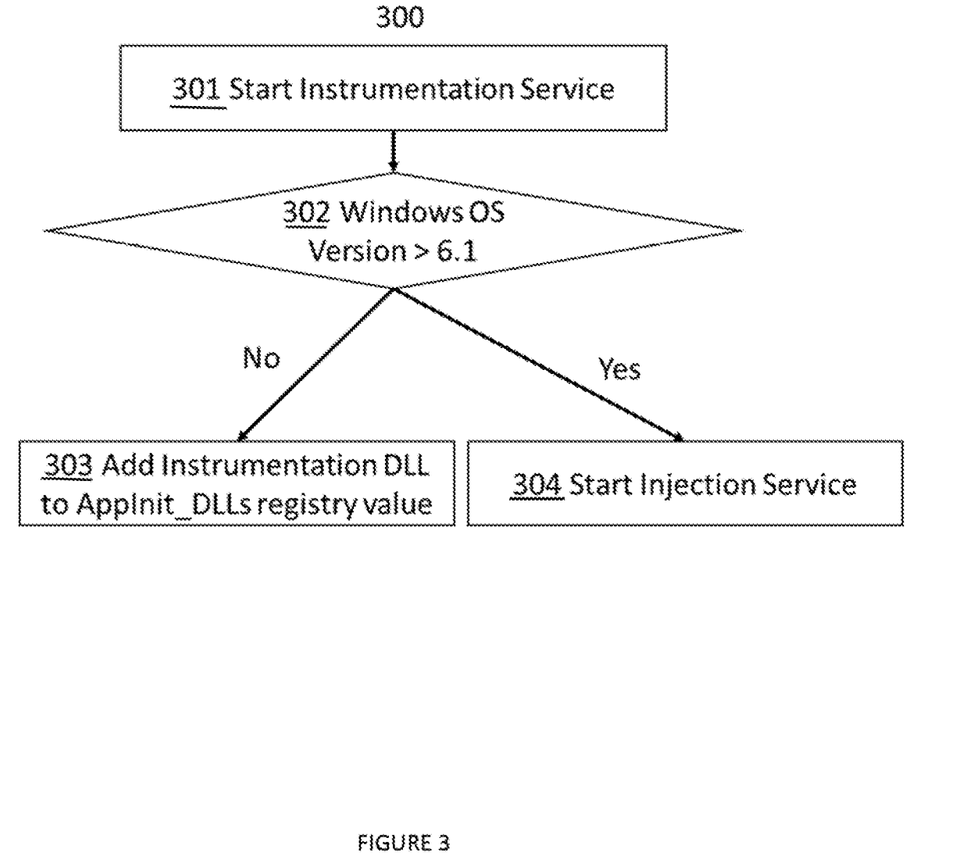
FIG. 3 is a process illustrating the service's decision process for loading the native instrumentation library, according to some embodiments.

FIG. 2 illustrates a Host Process 200 hosting an instance of the .NET Framework's CLR 201 with an instrumentation engine, according to some embodiments. The code can be similarly divided into Native Code 202 and Managed Code 205. A Service 209 can be responsible for loading the instrumentation engine library 210 into the Host Process 200 using well known techniques based on operating system capabilities. It is noted that FIG. 3 provides additional detail of this library loading process. The Replacement Compile 211 method contains the logic necessary to compare compiled methods against Policy 212 describing methods to be instrumented, the logic to load a new Assembly 213 containing the Target method 214, and the logic to redirect the 208 Source method to the new Target method 214.

FIG. 3 is a process 300 of the logic of the Service 209 that assists in setting up the environment for instrumentation, according to some embodiments. In step 301, the service starts and determines the version of the WINDOWS® Operating System (OS). In step 302, an optional configuration flag is checked. If the flag is false or not present, then Service 209 implements step 304. In step 304, process 300 start a Native Injection Service. Otherwise, the Service 209 implements step 303. Step 303 adds instrumentation DLL file path to AppInit DLL's registry value.

Figure 4:
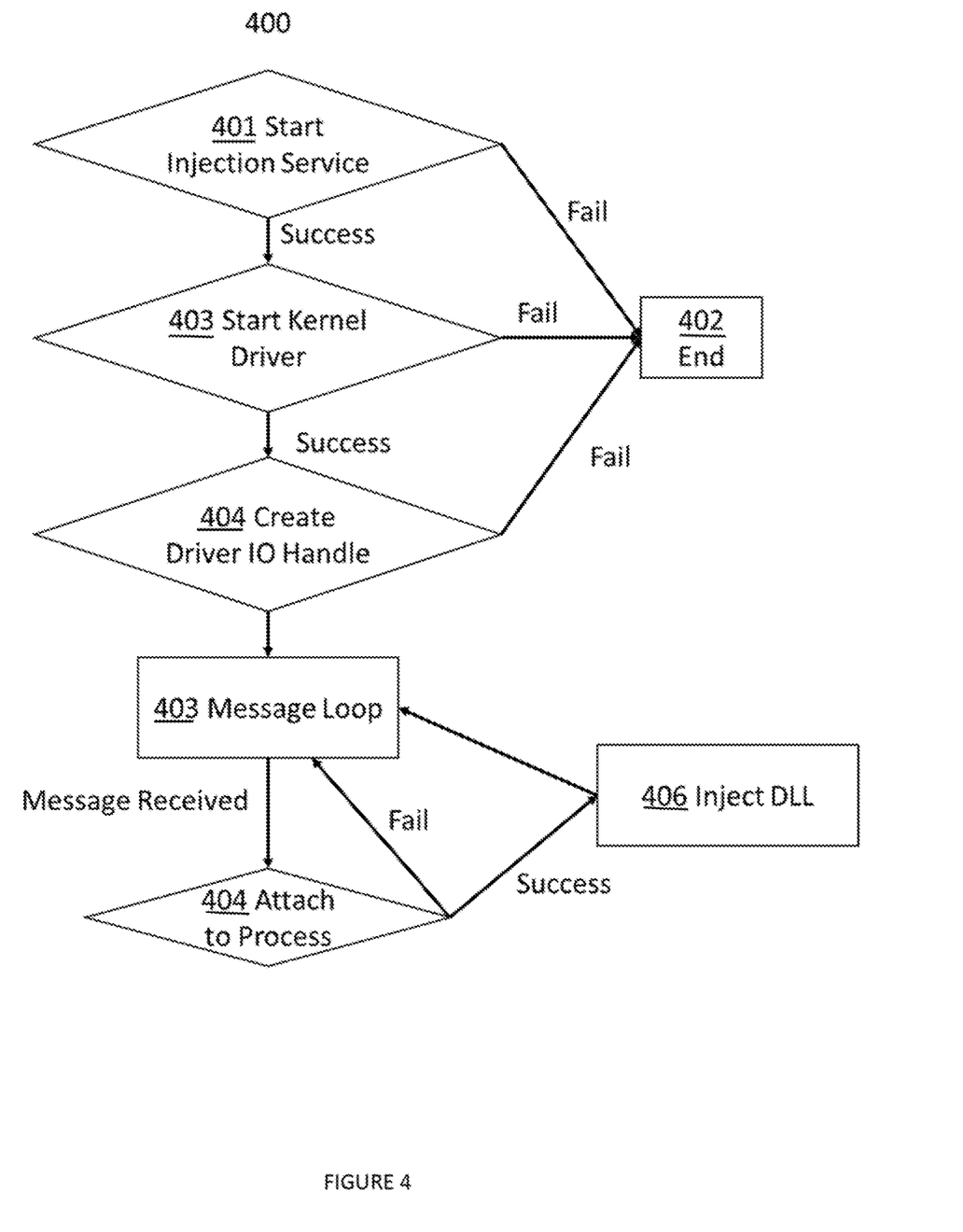
FIG. 4 is a process for injection service/kernel driver for loading the native instrumentation library, according to some embodiments.

FIG. 4 illustrates an example process 400 of the logic of a native injection service/kernel driver, according to some embodiments. In step 401, the service starts and creates the kernel driver. If this start up fails, then the service exits 402. In step 403, the service then starts the kernel driver and exits 402 if starting the kernel driver fails. In step 404, the service then enters a 403 Message Loop. When a message is received, 404 the service attaches to the process. The service returns to the message loop if attaching to the process fails.

Figure 5:
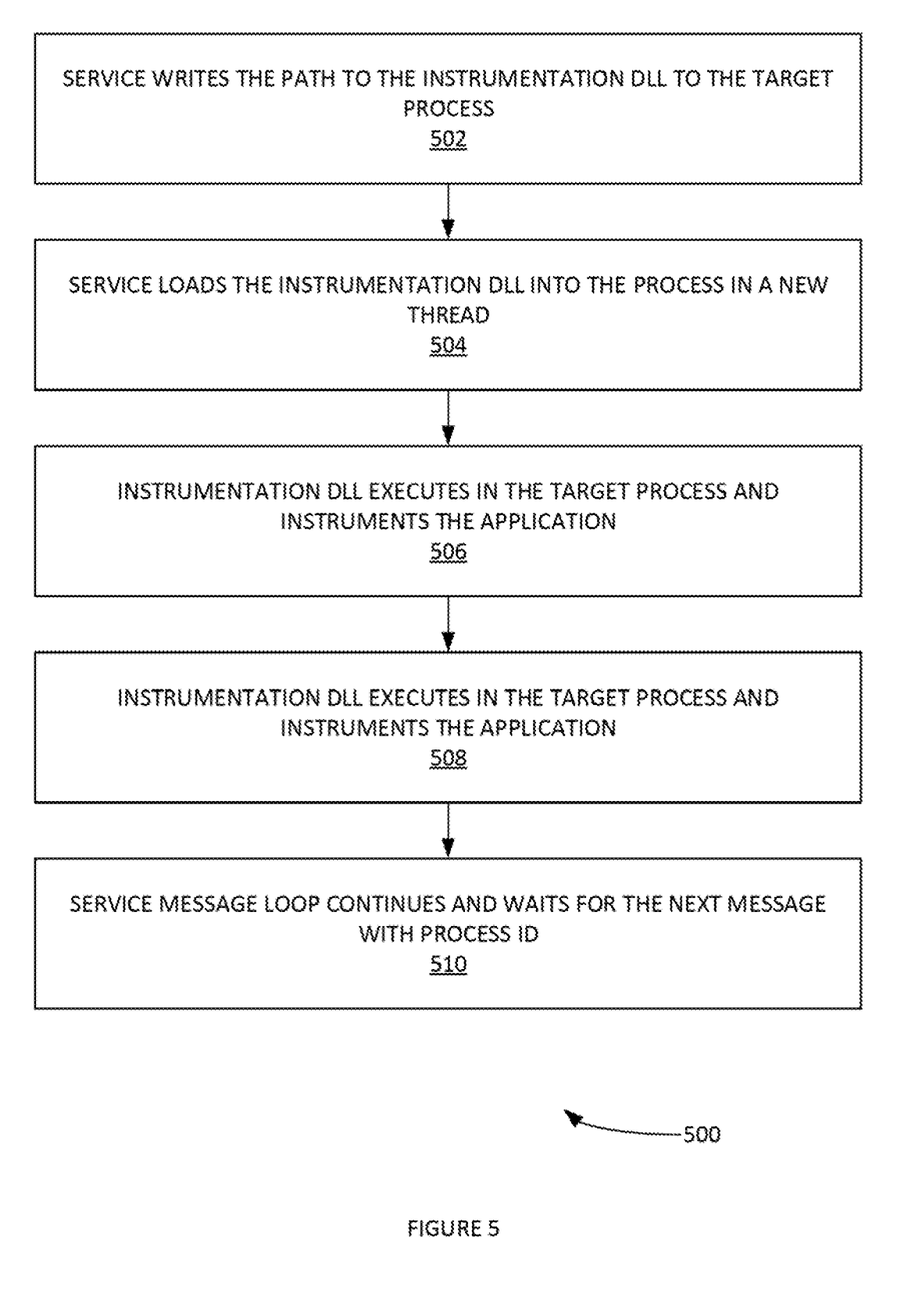
FIG. 5 is a process illustrating the instrumentation library's decision process for hooking a process to be instrumented, according to some embodiments.

FIG. 5 illustrates the injection service hooking a target process. The injection service receives a new IO message, in step 502. The IO message contains the process ID of a target process. In step 504, the service writes the path to the instrumentation DLL to the target process. In step 506, the service loads the instrumentation DLL into the process in a new thread via the path supplied in 504. In step 508, the instrumentation DLL executes in the target process and instruments the application. The service message loop continues, in step 510, and waits for the next message with process ID. If there is an error in 504, 506 or 508, the service can wait return back to the message loop without instrumenting the application.

Figure 6:
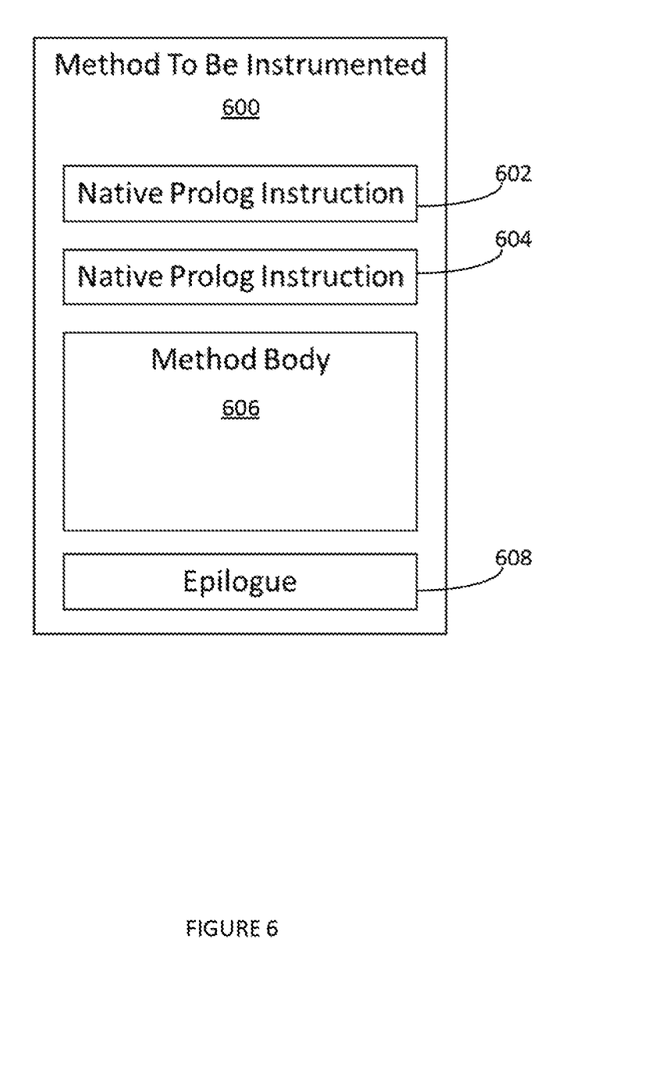
FIG. 6 is a block diagram of the layout of a managed code method in the .NET Framework, illustrating the method's native prologue and managed code method body, according to some embodiments.

FIG. 6 is a block diagram of the layout of a managed code method to be instrumented 600, according to some embodiments. The method to be instrumented 600 can be in the .NET Framework. FIG. 6 illustrates method 600 native prologue instruction(s) 602 and managed code method body 604. Managed method 604 can include a native code prologue, a method body of managed code, and a native code epilogue 606. Both the native prologue instruction(s) 602 and native code epilogue 606 can include multiple native code instructions.

Figure 7:
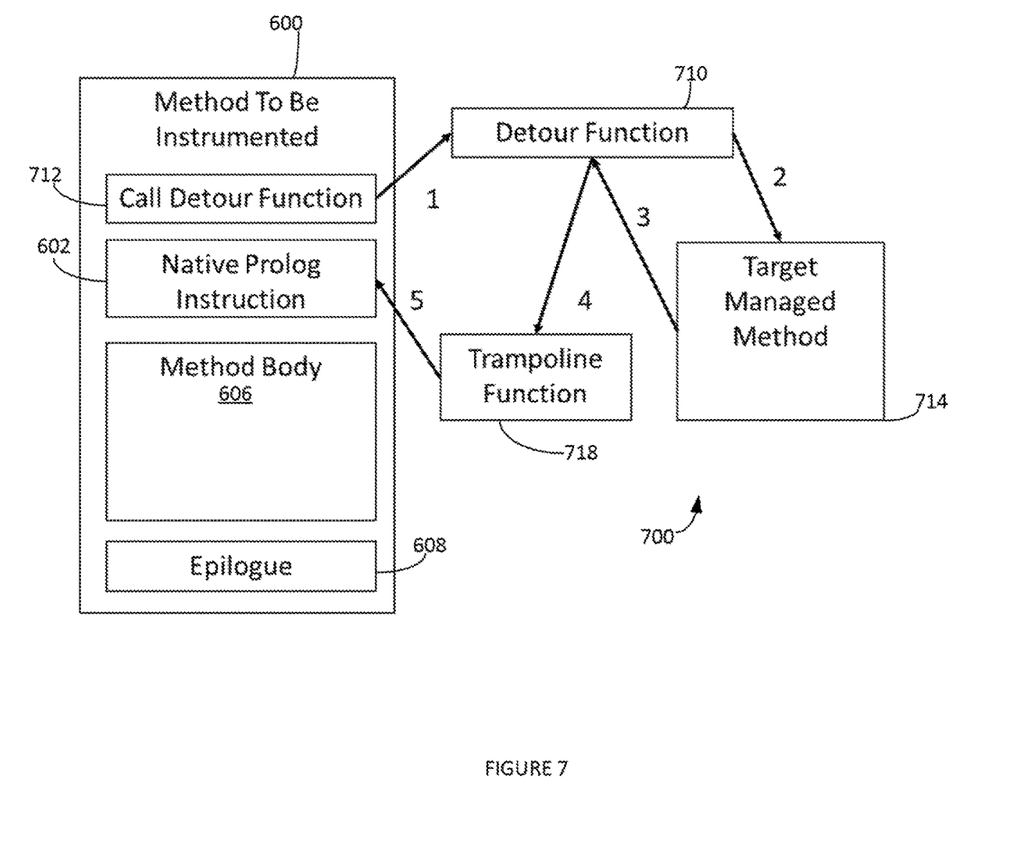
FIG. 7 is a block of the layout of a managed code method in the .NET Framework, illustrating a possible instrumentation of the method's native prologue and managed code method body, according to some embodiments.

FIG. 7 is a block of the layout of managed code method 600 in the .NET Framework, illustrating a possible instrumentation of the method's native prologue 602 and managed code method body 606, according to some embodiments. If a method is instrumented, the method is redirected via a call to a Detour Function 712 that accepts the target managed method 714. The detour function replaces the native prologue to jump to a new function. Execution is returned to the Detour Function 712. The Detour Function 712 then creates trampoline that will return the execution 714 back to the original method prologue 602. One example sequence of steps is provided with ordinal numbers 1-5 in FIG. 7. For example, at step 5, execution is returned to the current method native prologue and the instrumented code executes. Methods to be instrumented 600 can include call detour function 712, a native prologue instruction 602, a method body of managed code 606, and an epilogue 608.

Figure 8:
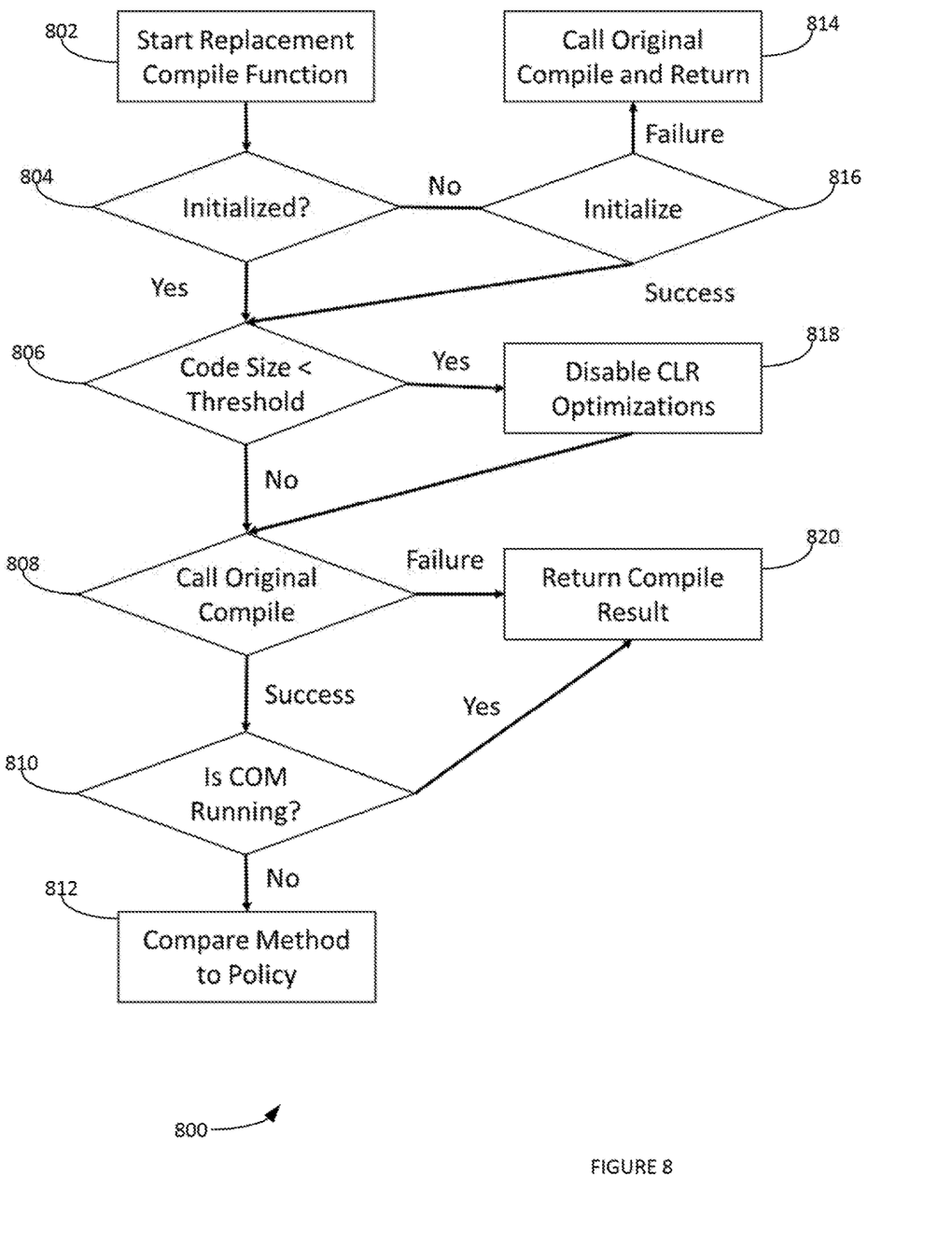
FIG. 8 is a process illustrating the instrumentation engine's replacement compile function's initialization and decisions on modifying compilation parameters.

FIG. 8 is a process 800 illustrating the instrumentation engine's replacement compile function's initialization and decisions on modifying compilation parameters, according to some embodiments. At the start of the replacement compile function 802, process 800 checks if the replacement function has been initialized 804. If it has not been initialized, then the instrumentation engine takes several steps to initialize in step 816. These steps may include replacing the CLR's CanInline function to disable inlining. This can allow the instrumentation engine to reliably instrument any .NET method: an inlined method is not JIT compiled. Initialization may also obtain handles to certain interfaces from the CLR such as ICLRMetaHost and IMetaDataDispenser (e.g. provides methods to create a new metadata scope, or open an existing one) that are useful to obtain information about the CLR such as version and to obtain metadata handles for assemblies loaded by the CLR. If the function does not successfully initialize then the replacement function will call the original compile function and return in step 814. If initialization is successful, the size of the code for the method being compiled is examined in step 806. If it is below a certain threshold, then CLR optimizations are disabled by setting a compiler parameter in step 818. Optimizations are disabled for small methods because the native prologue and epilogue of small optimized methods are not large enough to hold the native code necessary to redirect the method. The original compile method is called next and if this call fails then the replacement compile function immediately returns the original compile function's failure result in step 808. Otherwise, an implementation may check if a Component Object Model (COM) operation is currently running which may be the result of a concurrent compilation call that is looking up application domain information in 810. If so, the replacement compile function returns. Otherwise, the replacement compile function continues to compare the method against a policy that specifies methods to be instrumented in step 812.

Figure 9:
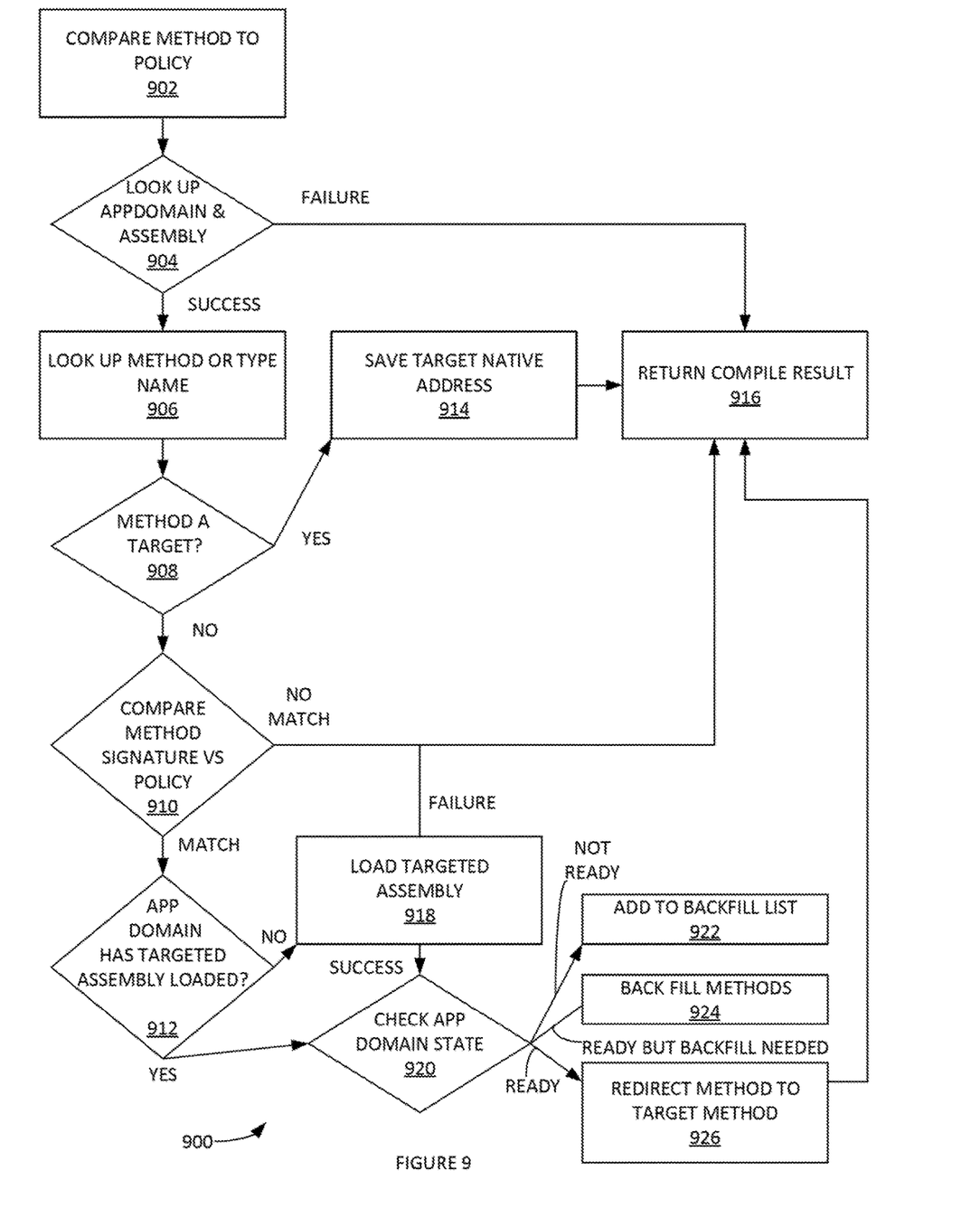
FIG. 9 is a process illustrating the instrumentation engine's determination to instrument a method.

FIG. 9 is a process 900 illustrating the instrumentation engine's decision process for determining if a method should be instrumented or not. At the start of this process, the compilation function looks up the application domain and assembly information for the method being compiled. If this step fails, the function returns. Otherwise, the function continues and looks up the method type and name. If the method is a target method then the native address of the method is saved and the compile result is returned in step 820. If the method is not a target method then it is compared against a policy of methods to be instrumented. If no policy match is found, then the function returns. Otherwise the function checks if the application domain has loaded the assembly containing the target method for the match. If the assembly has not been loaded, then the function loads it using standard mechanisms. The function returns if the assembly fails to load. If the assembly has been loaded, then the replacement compilation function checks the state of the application domain. If the application domain is not ready for instrumentation, then the method's details and policy match are saved to a list of methods to be instrumented later ("backfilled") when the application domain is ready. If the application domain is ready but there are methods to be backfilled, then the function goes through each method and redirects it accordingly. If the application domain is ready, then the method is redirected to the target method. Finally, the replacement compilation function returns the compilation result.

The present disclosure's redirection of managed methods can use existing techniques such as MICROSOFT's Detours Library or other techniques that build up method redirection using native JMP and CALL instructions.

Figure 10:
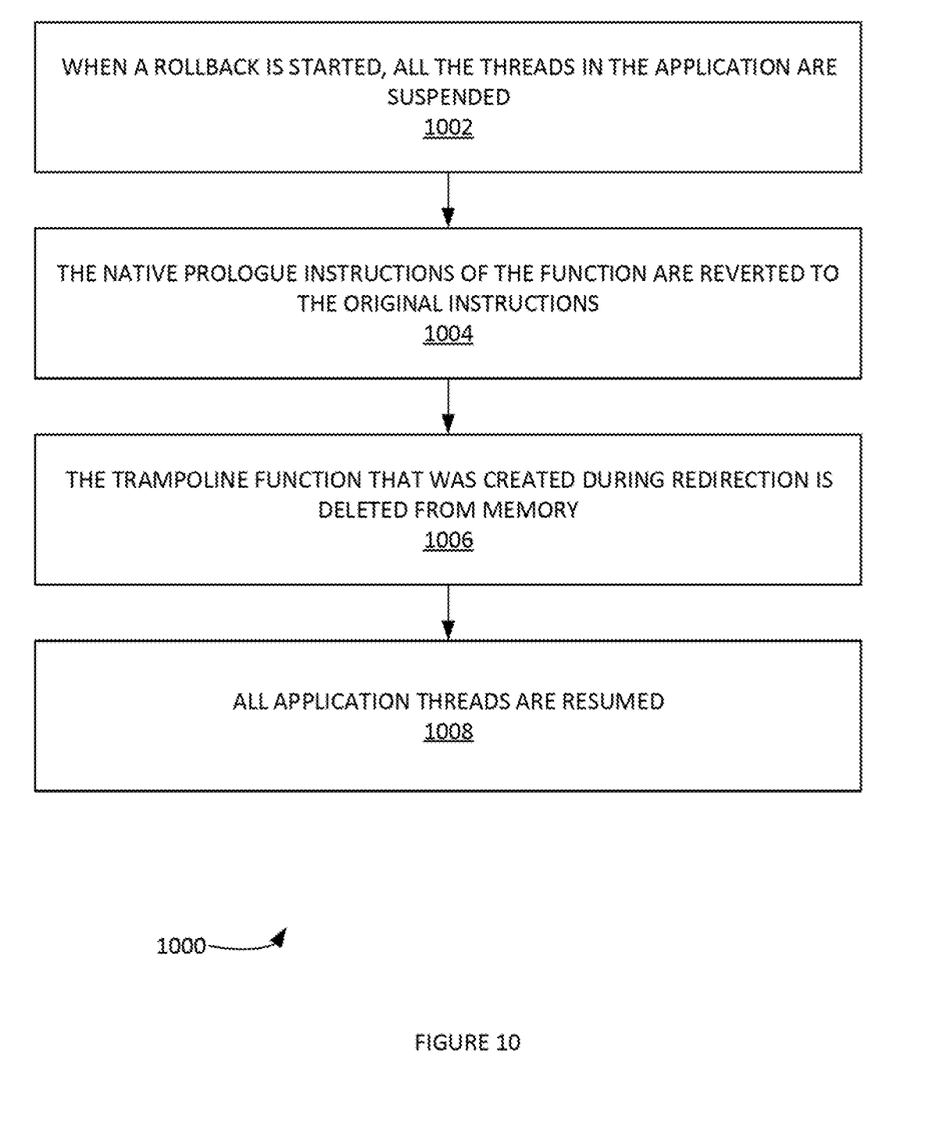
FIG. 10 is a process for rolling back redirected methods to the original functionality, according to some embodiments.

FIG. 10 is a process for rolling back redirected methods to the original functionality, according to some embodiments. In step 1002, when a rollback is started, all the threads in the application are suspended. In step 1004, the native prologue instructions of the function are reverted to the original instructions 602. In step 1006, the trampoline function (e.g. trampoline function 718) that was created during redirection is deleted from memory. All application threads are then resumed in step 1008 and the function can operate as it was originally intended.

Instrument methods specific to the application being instrumented are now discussed. In one embodiment, ASP-.NET's AppManagerAppDomainFactory can be an example. A Create may be detoured to a method that then calls into the native instrumentation library to roll back instrumentation on BCL methods. When the method is entered, instrumentation can be rolled back. When the method exits, the application domain has been created and can be ready so instrumentation is restored/rolled forward. The target method can call the native method using known techniques such as Native Methods.GetProcAddress and Marshal.GetDelegateForFunctionPointer.

Figure 11:
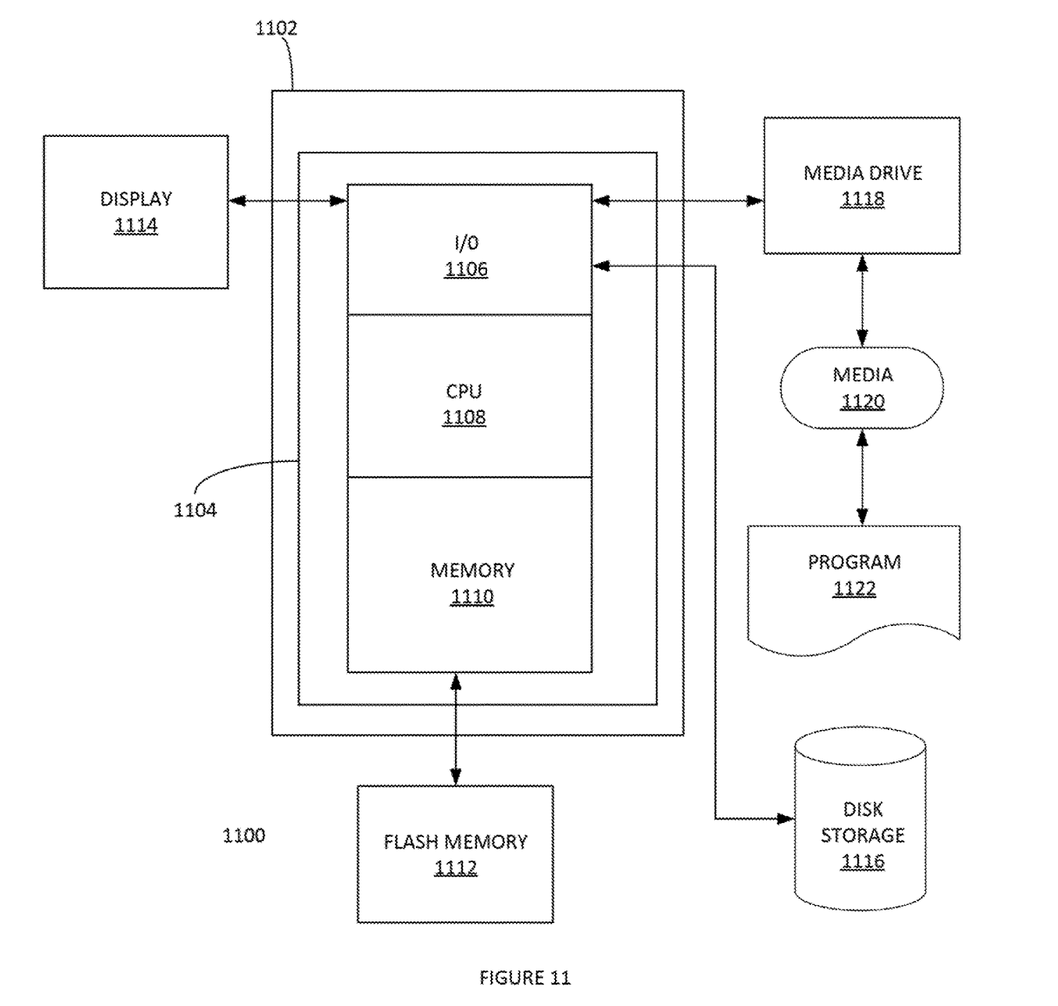
FIG. 11 depicts an exemplary computing system that can be configured to perform any one of the processes provided herein.

FIG. 11 depicts an exemplary computing system 1100 that can be configured to perform any one of the processes provided herein. In this context, computing system 1100 may include, for example, a processor, memory, storage, and I/O device (e.g., monitor, keyboard, disk drive, Internet connection, etc.). However, computing system 1100 may include circuitry or other specialized hardware for carrying out some or all aspects of the processes. In some operational settings, computing system 1100 may be configured as a system that includes one or more units, each of which is configured to carry out some aspects of the processes either in software, hardware, or some combination thereof.

FIG. 11 depicts computing system 1100 with a number of components that may be used to perform any of the processes described herein. The main system 1102 includes a motherboard 1104 having an I/O section 1106, one or more central processing units (CPU) 1108, and a memory section 1110, which may have flash memory card 1112 related to it. The I/O section 1106 can be connected to a display 1114, a keyboard and/or other user input (not shown), a disk storage unit 1116, and a media drive unit 1118. The media drive unit 1118 can read/write a computer-readable medium 1120, which can contain programs 1122 and/or data. Computing system 1100 can include a web browser. Moreover, it is noted that computing system 1100 can be configured to include additional systems in order to fulfill various functionalities. Computing system 1100 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions an data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g. LAN, a WAN, and the computers and networks forming the Internet.

In addition, the systems provided herein can also operate in a hosted computing system, often referenced as "the cloud." The systems provided herein can be stored and executed from a server system, rather than from a client device, thus allowing the systems provided herein to be shared easily between users. In addition, the systems provided herein can also be implemented to operate with wireless handheld and/or specialized devices. The computer system can include clients and servers. A client and server are generally remote from each other and typically interact through a network, such as the described one. The relationship of client and server arises by virtue of computer programs running on the respective computers and having a client-server relationship to each other. However, one skilled in the art would recognize that any application, whether it embedded, mobile, desktop, server, or cloud, could use the described technology to detect vulnerabilities. Accordingly, one can use the described detection technology to monitor the running application and receive notifications when the application violates the established policies.

In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other implementations are within the scope of the following claims.

A number of implementations of the present disclosure have been described. Nevertheless, it will be understood that various modifications can be made without departing from the spirit and scope of the present disclosure. Accordingly, other implementations are within the scope of the following claims.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized method for instrumenting virtual-machine-based applications of a virtual machine implemented by the computing system comprising:
   with a computer processor of a computing system, implementing a .NET framework;
   providing the virtual machine with a Just-In-Time Compilation function;
   loading a native library into a process memory;
   redirecting the Just-In-Time Compilation function to a custom implementation of a replacement compilation function, wherein the custom replacement compilation function:
     creates a representation of one or more methods being compiled, and compares the one or more methods of the virtual machine against a policy of methods to be instrumented, wherein a policy of a method to be instrumented comprises a description of methods to be instrumented, a logic to bad a new assembly containing a redirection target, and a logic to redirect a source method to the redirection target contained by the new assembly;
   determining that one or more methods match the policy of methods to be instrumented;
   compiling the one or more methods that matched the policy of methods to be instrumented;
   compiling another redirection target of the one or more methods that matched the policy of methods to be instrumented, wherein the other redirection target comprises a memory address of a sensor method;
   leveraging one or more computing system capabilities of the computing system to load one or more managed libraries, wherein the one or more managed libraries comprises the redirection target and gather information that is not readily available to a native library of the computing system; and
   redirecting at least one method in a first managed library of the one or more managed libraries to a second method in a different managed library of the one or more managed libraries.

2. The computerized method of claim 1 further comprising:
   determining a computer system type; and
   selecting a mechanism based on a computer system capability of the computer system type.

3. The computerized method of claim 2, wherein the Just-In-Time Compilation function comprises an application targeting the .NET Framework.

4. The computerized method of claim 3, wherein the Just-In-Time Compilation function is implemented on a Common Language Runtime (CLR) component of the virtual machine.

5. A computerized system of a .NET framework for instrumenting virtual-machine-based applications comprising:
   a computer store containing data, wherein the data comprises:
   a native library;
   a computer processor in the computerized system, of which the computer processor is configured to:
   provide a virtual machine with a Just-In-Time Compilation function;
   load the native library into a process memory;
   redirect the Just-In-Time Compilation function to a custom implementation of a replacement compilation function, wherein the custom replacement compilation function:
     creates a representation of one or more methods being compiled, and
     compares the one or more methods of the virtual machine against a policy of methods to be instrumented, wherein a policy of a method to be instrumented comprises a description of methods to be instrumented, a logic to load a new assembly containing a redirection target, and a logic to redirect a source method to the redirection target contained by the new assembly;
   determine that one or more methods match the policy of methods to be instrumented;
   compile the one or more methods that matched the policy of methods to be instrumented;
   compiles another redirection target of the one or more methods that matched the policy of methods to be instrumented, wherein the other redirection target comprises a memory address of a sensor method;
   leverages computing system capabilities of the computerized system to load one or more managed libraries, wherein the one or more managed libraries comprise the redirection target and gather information that is not readily available to a native library of the computing system; and
   redirect at least one method in a first managed library of the one or more managed libraries to a second method in a different managed library of the one or more managed libraries.

6. The computerized system of claim 5, wherein the redirections are performed at a later time in an application lifecycle of a virtual-machine-based application.

7. The computerized system of claim 5, wherein the redirections use information gathered through system capabilities of the computing system.

8. The computerized system of claim 5, wherein the redirection targets are in the different managed library.

* * * * *